(12) United States Patent
Palm

(10) Patent No.: US 6,792,896 B2
(45) Date of Patent: Sep. 21, 2004

(54) HOLDING TUBE FOR A HEAT TREATMENT PLANT USING INJECTION HEATING

(75) Inventor: Bengt Palm, Genarp (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 10/470,539
(22) PCT Filed: Jan. 29, 2002
(86) PCT No.: PCT/SE02/00155
 § 371 (c)(1),
 (2), (4) Date: Jan. 14, 2004
(87) PCT Pub. No.: WO02/060282
 PCT Pub. Date: Aug. 8, 2002

(65) Prior Publication Data
 US 2004/0123814 A1 Jul. 1, 2004

(30) Foreign Application Priority Data
 Jan. 30, 2001 (SE) .......................... 01002716

(51) Int. Cl.$^7$ ............................................. F22B 5/04
(52) U.S. Cl. .................................... 122/19.1; 426/511
(58) Field of Search ........................... 122/20 R, 19.1, 122/35, 488, 489; 426/510, 511, 522; 99/452, 453, 483, 532

(56) References Cited

U.S. PATENT DOCUMENTS

| 4,385,908 A | * | 5/1983 | Carmichael ..................... 95/24 |
| 4,390,350 A | * | 6/1983 | Palm ........................... 95/243 |
| RE31,513 E | * | 1/1984 | Glen ........................... 426/521 |
| 4,752,487 A | | 6/1988 | Collyer et al. |
| 4,818,845 A | * | 4/1989 | Koizumi et al. ............ 392/462 |
| 5,727,452 A | | 3/1998 | Jensen |

FOREIGN PATENT DOCUMENTS

| EP | 0617897 | 10/1994 |
| WO | 9807328 A1 | 2/1998 |

* cited by examiner

*Primary Examiner*—Gregory A. Wilson
(74) *Attorney, Agent, or Firm*—Burns, Doane, Swecker & Mathis, L.L.P.

(57) ABSTRACT

The invention relates to a holding tube for a heat treatment plant using injection heating. The holding tube includes a first, fixed section consisting of a conduit of predetermined and a constant counter pressure valve. The holding tube also includes a second, adjustable section. The second, adjustable section consists of a cyclone and an inclining conduit of a predetermined length. In the inclining conduit there is disposed a device for maintaining a defined liquid level in the conduit.

7 Claims, 1 Drawing Sheet

HOLDING TUBE FOR A HEAT TREATMENT PLANT USING INJECTION HEATING

FIELD OF THE INVENTION

The present invention relates to a holding tube for a heat treatment plant using injection heating, comprising a first, fixed section consisting of a conduit of a predetermined length, and also a constant counter pressure valve.

BACKGROUND OF THE INVENTION

The heat treatment of food products for extended shelf life is a well-known and often employed method. The food products may, for example, consist of various dairy products such as milk, cream or yoghurt.

The heat treatment may be put into effect in a plurality of different ways, directly or indirectly. Indirect methods are, for example, heating by means of different types of heat exchangers. There are two main types of direct methods, injection and infusion, where heating takes place by means of steam. By employing a direct method, an extremely rapid heating will be obtained. Rapid heating is, today, desirable when a product of long shelf life is sought for at the same time as the intention is to obtain a product with improved flavour properties. The rapid heating permits heating to elevated temperatures for brief periods of time, which reduces thermal stresses on the product and thereby reduces the risk of overtreatment.

The present invention relates to heating by means of injection. Today, injection is a common heating method in commercial heat treatment plants which employ direct heating.

Heating by injection implies that the product, for example milk, is preheated to approx. 80° C. and pressurised. The product enters, together with superheated steam, into an injector and is there intermingled, normally with the aid of annular, concentric nozzles. The steam is condensed and heat is transferred to the product which, by such means, is very rapidly heated to the desired temperature.

All modem heat treatments of food products have for their purpose, on the one hand, to heat the product to a certain predetermined temperature, and, on the other hand, to keep the product at this temperature for a certain, predetermined period of time. During this time interval, the product stays in a so-called holding tube. By selecting different temperatures and different stay times, products will be obtained which are aseptic or which have extended shelf life.

For heat treatment plants using injection heating, use is made of separate holding tubes which may consist of a helical conduit of a predetermined length or a section of straight conduit of a predetermined length. Alternatively, the holding tube may consist of a combination of helical and straight conduit.

Regardless of the design of such holding tubes, they cannot be adjusted. The capacity for which the heat treatment plant—and thereby also the holding tube—is calculated normally corresponds to a number of filling machines for packing the product in consumer packages. When one or more of these filling machines possibly drops out of operation because of some operational stoppage, the flow is reduced and there rapidly occurs an overly long stay time in the holding tube, with the result that the product becomes overtreated. It is therefore desirable in the art that the holding tube may rapidly be adjusted so that the stay time can be kept constant. Also when the intention is to be able rapidly to vary production to meet different foods which require different stay times, use may be made of an adjustable holding tube. Without such a possibility of varying the stay time, the plant must be rebuilt or alternatively an overtreated product must be tolerated.

A variable holding tube is disclosed in Swedish Patent Specification SE 510797. This holding tube has one or more cooled sections which may be stepwise coupled in when necessary. A disadvantage inherent in this holding tube is that the steps by which the holding tube may be reduced are fixed, and, in certain applications, the steps may be too large.

SUMMARY OF THE INVENTION

One object of the present invention is to design a holding tube which is steplessly adjustable and which gives a reliable and defined stay volume for the product.

A further object of the present invention is that the holding tube is to be simple and economical to manufacture and may be washed in a satisfactory manner together with the remaining equipment in the plant.

These and other objects have been attained according to the present invention in that the holding tube of the type described by way of introduction has been given the characterising feature that the holding tube also includes a second, adjustable section consisting of a cyclone and an inclining conduit of a predetermined length, as well as a device disposed to maintain a defined liquid level in the conduit.

Preferred embodiments of the present invention have further been given the characterising features as set forth in the appended subclaims.

BRIEF DESCRIPTION OF THE DRAWING

One preferred embodiment of the present invention will now be described in greater detail hereinbelow, with reference to the accompanying Drawing, in which.

Figure 1:
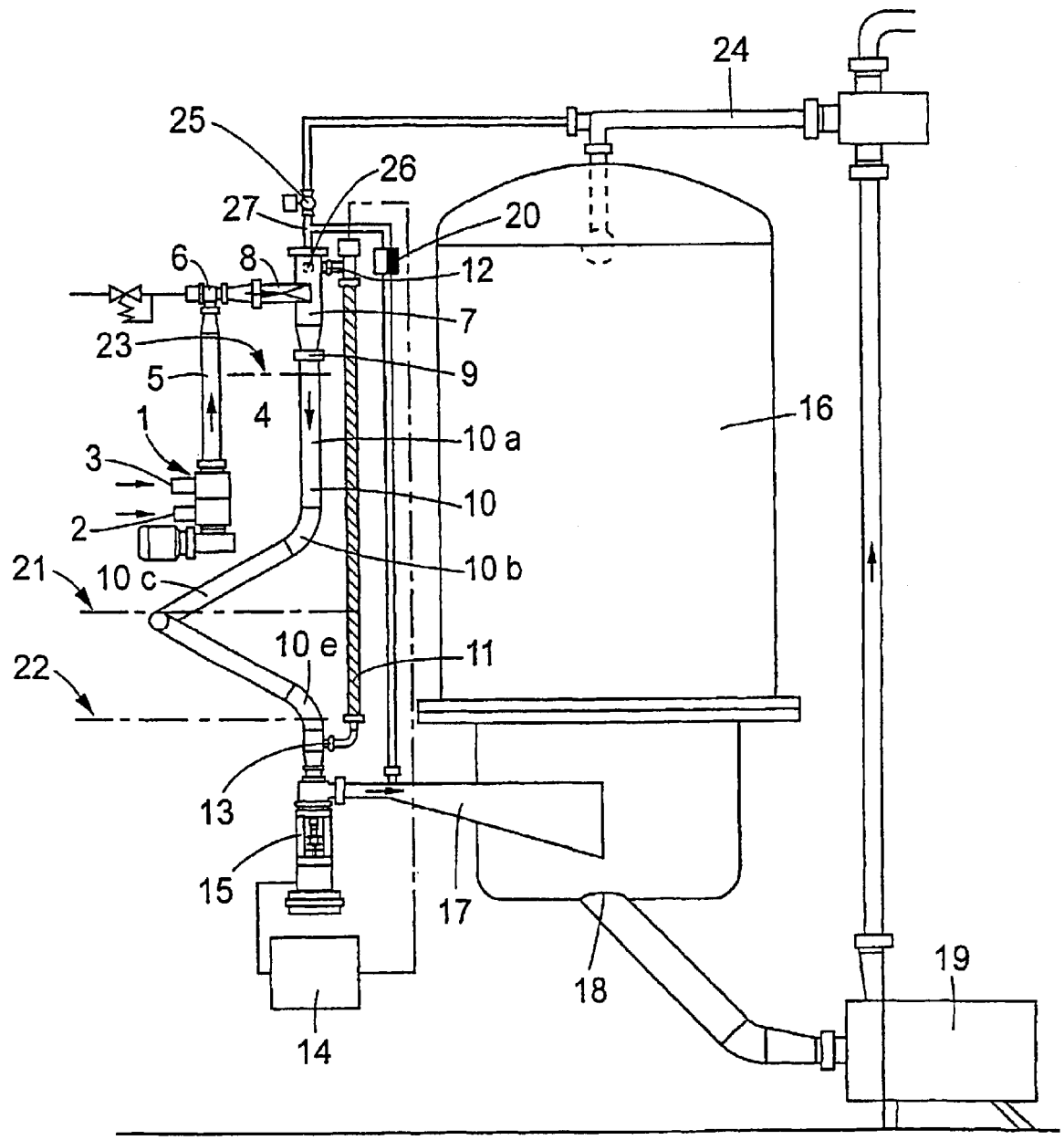
FIG. 1 is a side elevation of the present invention placed in a part of a heat treatment plant.

The Drawing shows only those parts and details essential to an understanding of the present invention, and the remaining parts of the heat treatment plant—well known to a person skilled in the art—have been omitted.

DETAILED DESCRIPTION OF THE INVENTION

FIG. 1 shows a part of a heat treatment plant for injection heating. An injector 1 has an inlet 2 for the product which is to be heat treated, and also an inlet 3 for superheated steam. The injector 1 also has art outlet 4 for product mixed with steam.

The holding tube is placed immediately after the injector 1. The holding tube includes a first, fixed section. The fixed section consists partly of a straight conduit 5 of a predetermined length. In the Figure, the conduit 5 is vertically placed. The conduit 5 may similarly be placed horizontally. The fixed section of the holding tube also consists of a constant counter pressure valve 6 which maintains the pressure in the conduit 5.

The holding tube also includes a second, adjustable section. The adjustable section commences with a cyclone 7 which is of relatively slight volume. The cyclone 7 has a tangential inlet 8 for the heated product. The outlet 9 of the cyclone 7 is directly connected to the remaining part 10 of the adjustable section of the holding tube.

The part 10 of the adjustable section of the holding tube consists of an inclining conduit of a predetermined length. The inclination may be anything from a straight vertical conduit with an inclination of 90° from the horizontal plane to an inclination of approx. 12°. The preferred inclination is 20–30°. The inclination should be approximately uniform throughout the entire conduit in order that the product have the same flow rate, but also in order to save space, the holding tube section suitably consists alternatingly of straight conduit lengths and pipe bends as shown on the Drawing. On the Drawing, the part 10 of the adjustable section of the holding tube consists of the part components 10a, 10b, 10c, 10d and 10e.

The holding tube is further provided with a level indicator 11 of conventional type. The level indicator 11 may employ ultrasound, floats, lasers or other suitable methods and it actually consists of height meters 12, 13 at two different levels. The measurement points 12, 13 are above and below, respectively, those levels where the level indicator 11 is operative. The value of the level indicator 11 is registered by a regulator 14 of conventional type which is disposed to control a conventional, aseptic regulator valve 15.

FIG. 1 also shows a vacuum vessel 16 placed immediately after the regulator valve 15. The vacuum vessel 16 has a tangential inlet 17 for the heat treated product and a product outlet 18 placed in the lower region of the vacuum vessel 16. The outlet 18 of the vacuum vessel 16 is normally connected to a pressure-elevating pump 19.

The product which is to be heat treated in a plant for which the holding tube according to the present invention is intended enters into the injector 1 through the product inlet 2. The product is liquiform and may, for example consist of a dairy product such as milk. Normally in an earlier stage in the production process, the product is pine-heated to approximately 80° C. and is at elevated pressure.

At the same time, superheated steam is fed into the injector 1 through the steam inlet 3. Inside the injector 1, the product and steam are forced through narrow annular nozzles. The annular nozzles are concentrically disposed and they blend the product and steam. The steam condenses in the product and transfers heat to it. The steam-mixed product departs from the injector 1 through the outlet 4.

The first, straight conduit 5 constitutes a part of the first, fixed section of the holding tube. At the same time, this straight conduit length 5 is necessary in order to obtain a complete condensation of the steam so that the product will be treated at the desired temperature. The conduit 5 should be of sufficient length to ensure satisfactory condensation. The constant counter pressure valve 6 which also constitutes a part of the fixed section of the holding tube ensures that the pressure is maintained in the conduit 5. In order to obtain a correct stay time in the holding tube, the conduit 5 must be completely filled with product.

After the constant counter pressure valve 6, the product is passed through the tangential inlet 8 into the cyclone 7. In the cyclone 7, a minor boiling takes place, simultaneously with de-aeration of the product, which creates a steam-air mixture. In order to monitor the quantity of steam-air mixture, the cyclone 7 is, in its upper region, connected to a conventional steam trap 20 which in turn is connected to the inlet 17 to the vacuum vessel 16. If the quantity of steam-air were to exceed a given desired level, the steam trap 20 opens and the surplus steam is recycled back to the product containing steam.

The product departs from the cyclone 7 through the outlet 9 arid thereafter reaches the adjustable section of the holding tube which consists of the inclining conduit 10. The conduit 10 is filled with product up to a defined liquid level 21. Above the liquid level 21, the steam-air mixture generated in the cyclone 7 fills out the remaining space in the conduit 10 and exercises a static pressure on the liquid surface. The steam-air mixture affords the possibility of obtaining a defined liquid surface 21 and the static pressure—which is greater than the pressure at which the liquid boils—thereby prevents boiling in the holding tube. The diameter of the conduit 10 in the adjustable section of the holding tube is selected such that the product flow rate below the liquid level 21, at maximum flow, does not exceed 0.45 m/s.

The defined liquid level 21 is located between a minimum level 22 and a maximum level 23 and is adjustable between these two levels 22, 23. The minimum level 22 is located in the conduit 10e just before the regulator valve 15. The maximum level is located just beneath the outlet 9 from the cyclone 7.

The defined liquid level 21 is measured using some form of conventional level indicator 11. The level indicator 11 may, for example, utilise measurements of the pressure in two points 12, 13. The upper point 11 should be placed above the maximum level 23 and is suitably placed in the upper region of the cyclone 7. The lower point 13 should be placed under the minimum level 22 and is suitably placed immediately before the regulator valve 15.

The value of the level indicator ills registered by the conventional regulator 14 which controls the regulator valve 15. The regulator valve 15 may consist of a conventional, aseptic throttle valve which opens and closes so that the defined liquid level 21 is constantly maintained. The level indicator 11, the regulator 14 and the regulator valve 15 together constitute a device for maintaining the defined liquid level 21.

After the regulator valve 15, the product (which has now been heat treated at the desired temperature and for the desired time interval) continues into the vacuum vessel 16. The product, which contains water and water vapor enters into the vacuum vessel 16 through the tangential inlet 17. The water which was supplied to the product is boiled off and the ready-treated product departs from the vacuum vessel 16 through the outlet 18. Via a pressure-elevating centrifugal pump 19, the product is conveyed further to additional treatment or to packing in consumer packages. Packing of the product may be put into effect in filling machines for aseptic single-use disposable packages.

The defined liquid level 21 is a norm value which is set in relation to further equipment in the heat treatment plant, such as the number of filling machines which the plant is to supply with product. The norm value which is to be selected also determines the desired degree of heat treatment, such as treatment into aseptic product or into a product possessing extended shelf life.

As the holding tube is shown in FIG. 1, the fixed section constitutes approx. 25% of the holding tube and the adjustable section constitutes 75. If, for example, one filling machine drops out of production, the holding tube may rapidly be adjusted so as to supply only the remaining filling machines with product, without down time and with a minimum of product recycling. The holding tube according to the present invention may naturally be designed so as to have a different split between the fixed section and the adjustable section.

For washing facility in the cyclone 7, this may simply be connected to a washing conduit 24 which is disposed to wash the vacuum vessel 16. Via a valve 25 and a washing nozzle 26 in the upper region of the cyclone, the cyclone 7 is interconnected to the washing conduit 24. The washing nozzle 26 may then be utilised as an outlet for excess steam from the cyclone 7, and a T-pipe 27 placed ahead of the valve 25 leads excess steam to the steam trap 20.

As will have been apparent from the foregoing description, the present invention realises a holding tube intended to be used for injection heating which is simple and relatively economical to manufacture. The holding tube is adjustable for variations in production or for different stay times. The holding tube is reliable and has, as a result of its design, built-in protection against boiling of the product in the holding tube.

What is claimed is:

1. A holding tube for a heat treatment plant using injection heating, comprising a first, fixed section consisting of a conduit of a predetermined length, and also a constant counterpressure valve, wherein the holding tube also includes a second, adjustable section consisting of a cyclone and an inclining conduit of a predetermined length, as well as a device disposed to maintain a defined liquid level in the conduit.

2. The holding tube as claimed in claim 1, wherein the inclining conduit has an inclination of 20–30° from the horizontal plane.

3. The holding tube as claimed in claim 1, wherein the inclining conduit has a diameter which gives a product flow rate below the liquid level which is less than 0.45 m/s.

4. The holding tube as claimed in claim 1, wherein the device for maintaining the liquid level includes a level indicator disposed to control a regulator valve, via a regulator.

5. The holding tube as claimed in claim 4, wherein the regulator valve consists of an aseptic throttle valve which is placed immediately after the adjustable section of the holding tube in the direction of flow.

6. The holding tube as claimed in claim 1, wherein the holding tube is adjustable between a minimum level and a maximum level.

7. The holding tube as claimed in claim 6, wherein the defined liquid level is a norm value between the minimum level and the maximum level.

* * * * *